Figure 5:
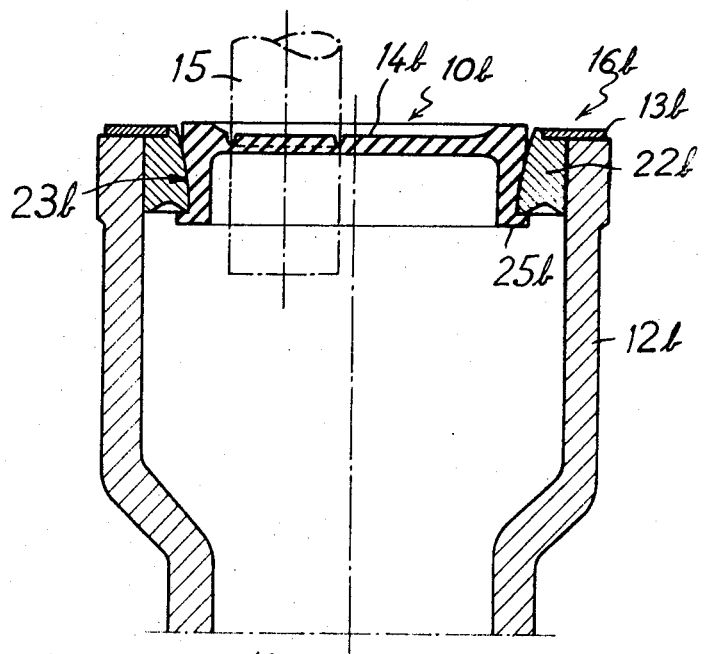

United States Patent

Gramain

[15] 3,654,965

[45] Apr. 11, 1972

[54] CLOSURE MEMBERS FOR PIPE SECTIONS

[72] Inventor: Jean Charles Marie Gramain, Paris, France

[73] Assignee: Pneumatiques, Caoutchouc Manufacture et Plastiques Kleber-Colombes, Colombes, France

[22] Filed: June 1, 1970

[21] Appl. No.: 42,308

Related U.S. Application Data

[63] Continuation-in-part of Ser. No. 737,500, June 7, 1968, abandoned.

[30] Foreign Application Priority Data

June 25, 1967 France......................................111805
Oct. 12, 1967 France......................................124310

[52] U.S. Cl.............................................138/89, 285/137
[51] Int. Cl..............................................F16l 55/10
[58] Field of Search............138/89, 90; 137/247.47, 247.51; 220/24.2, 24.3, 51; 285/137, 139, 237, 138, 3; 277/178

[56] References Cited

UNITED STATES PATENTS

| | | | |
|---|---|---|---|
| 2,596,182 | 5/1952 | Sosaya | 138/89 X |
| 2,956,822 | 10/1960 | Kates | 285/139 X |
| 3,048,911 | 8/1962 | Almon | 138/89 X |
| 3,254,153 | 5/1966 | Kohler | 285/137 X |
| 891,109 | 6/1908 | Speece | 138/89 X |

FOREIGN PATENTS OR APPLICATIONS

| | | | |
|---|---|---|---|
| 550,250 | 12/1942 | Great Britain | 138/89 |
| 496,407 | 9/1953 | Canada | 138/89 |
| 982,159 | 1/1951 | France | 138/89 |
| 1,398,064 | 3/1965 | France | 285/137 |
| 1,568,765 | 4/1969 | France | 285/137 |

*Primary Examiner*—Herbert F. Ross
*Attorney*—Holcombe, Wetherill & Brisebois

[57] ABSTRACT

This invention relates to closure members for closing the open end of a pipe section which is so arranged that it will allow the connection of a pipe having a diameter less than that of the pipe section. The closure member itself comprises a plug which has means incorporated therewith to limit axial movement and thus the depth of its passage into the open end of the pipe section and also resilient joint means for application to the internal wall of this open end. The plug also includes diaphragm means composed of an easily cuttable material so that a pipe can be passed therethrough that has a diameter less than that of the open end of the pipe section to which it is to be connected.

2 Claims, 22 Drawing Figures

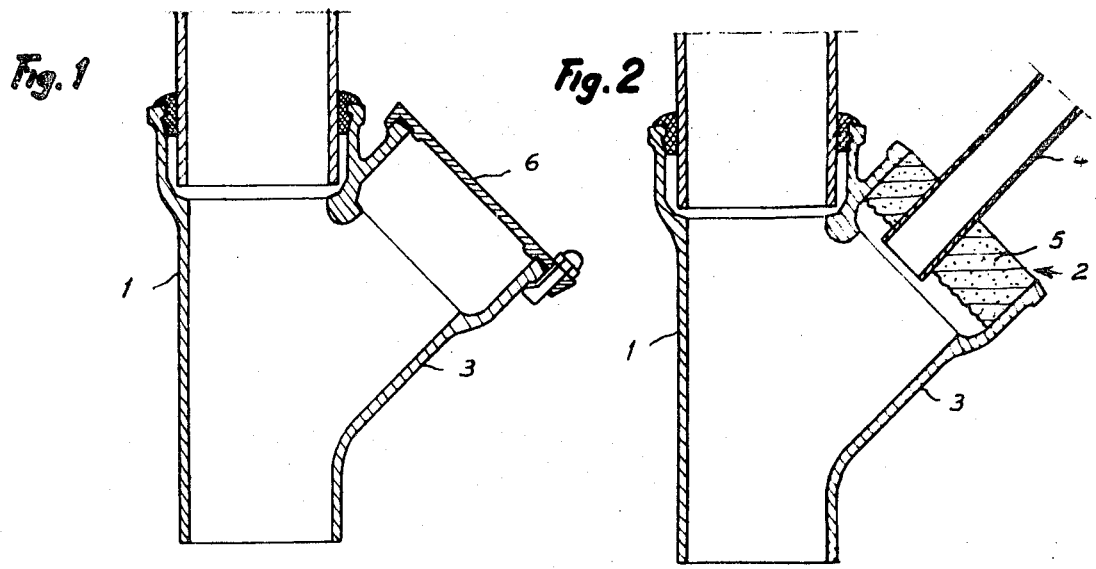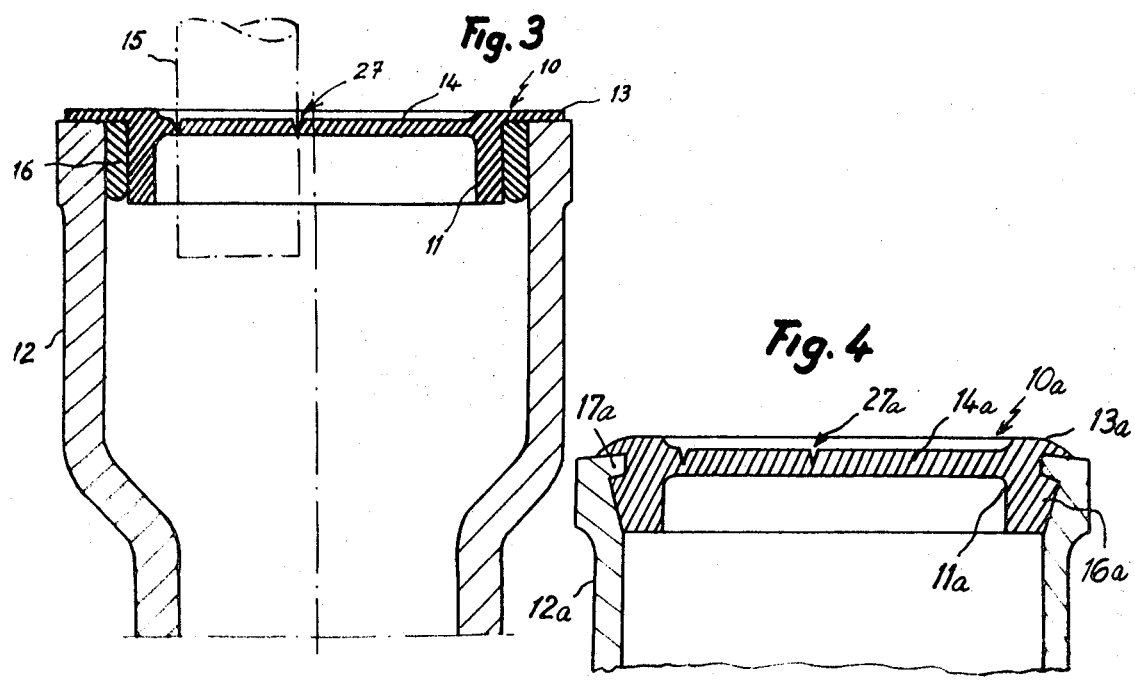

ized, reference will now be made to the accompanying drawings which show certain embodiments thereof by way of example in conjunction with an illustration of prior art practice, and in which:

CLOSURE MEMBERS FOR PIPE SECTIONS

This application is a continuation-in-part application of my copending application Ser. No. 737,500 filed 17th June, 1968, now abandoned.

The invention relates to closure members for obturating the open end of a pipe section in a sealed manner and has for an object means whereby pipes of a diameter less than said open end may be connected to the pipe section.

The invention consists in a closure member for obturating the opening end of a pipe section but which will allow the connection of a pipe having a diameter less than that of said pipe section, said closure member comprising a plug to plug the open end of the pipe section, said plug having axial movement-limiting means to limit the depth of its passage into the open end, resilient lateral joint means for application to the internal side wall of the open end, and said plug including diaphragm means of a material which is easily cuttable for passage therethrough of a pipe of a diameter less than that of the open end.

Figure 6:
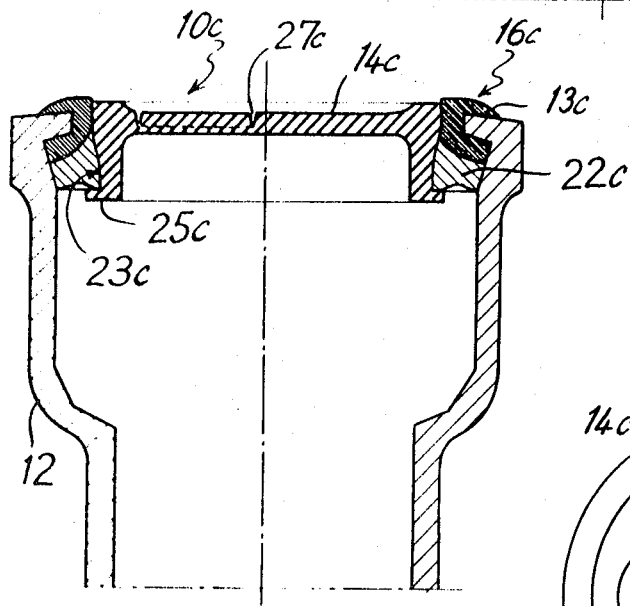
Figure 7:
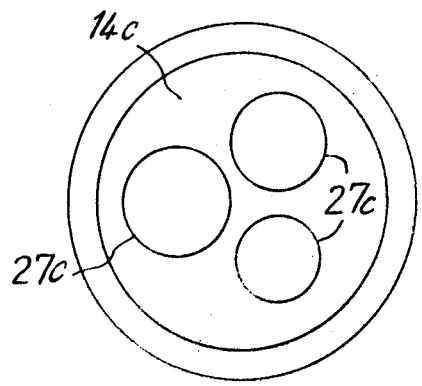
Figure 8:
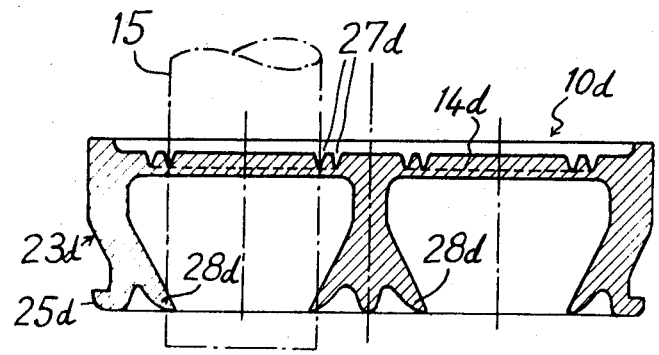
Figure 9:
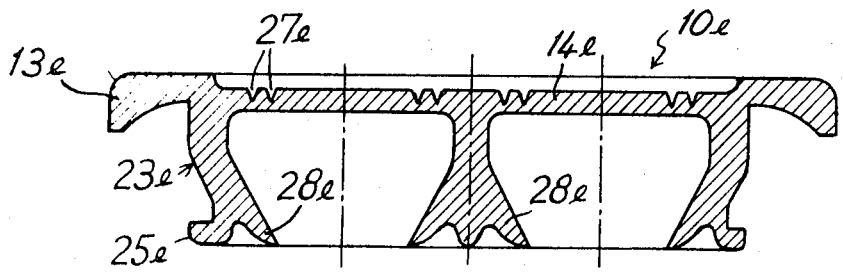
Figure 10:
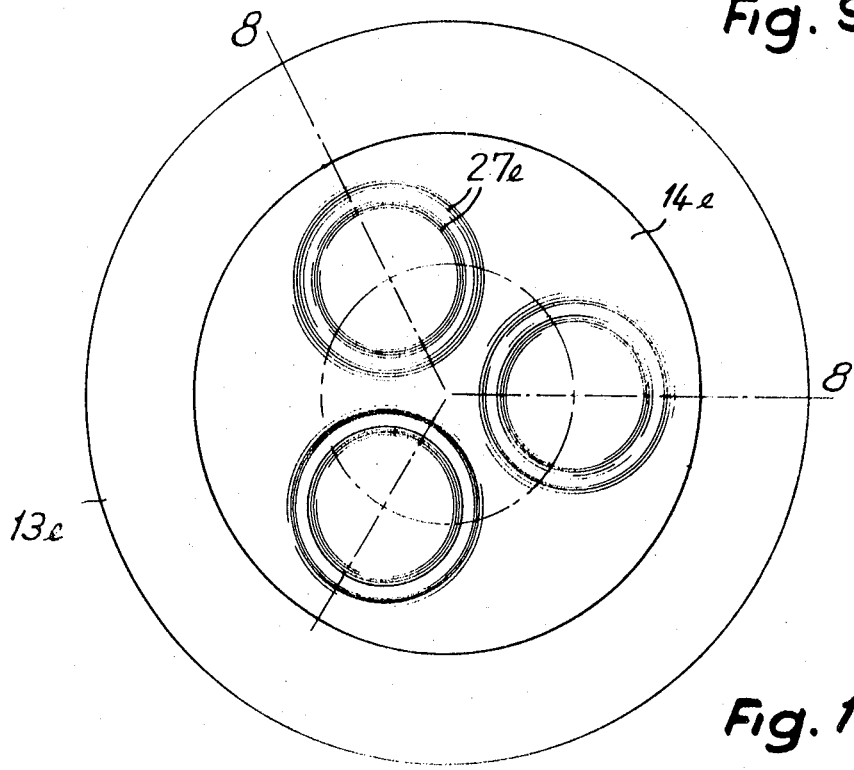
Figure 11:
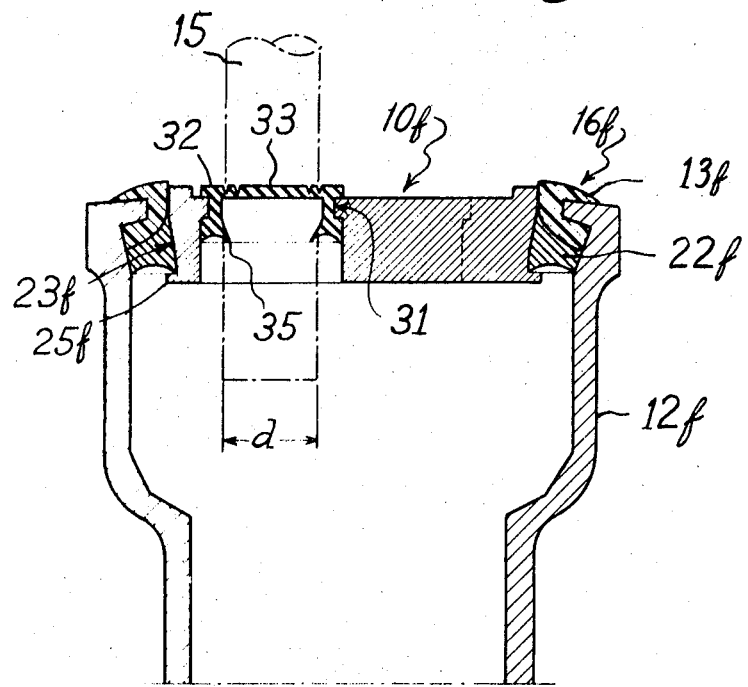
Figure 12:
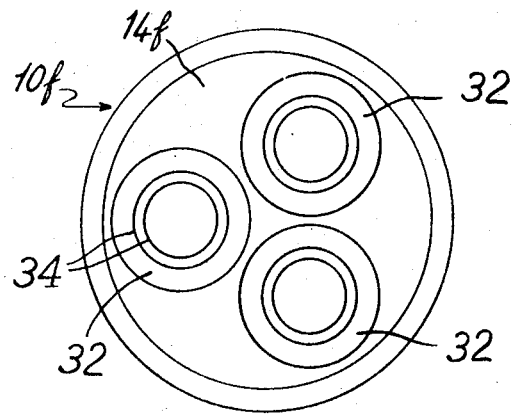
Figure 13:
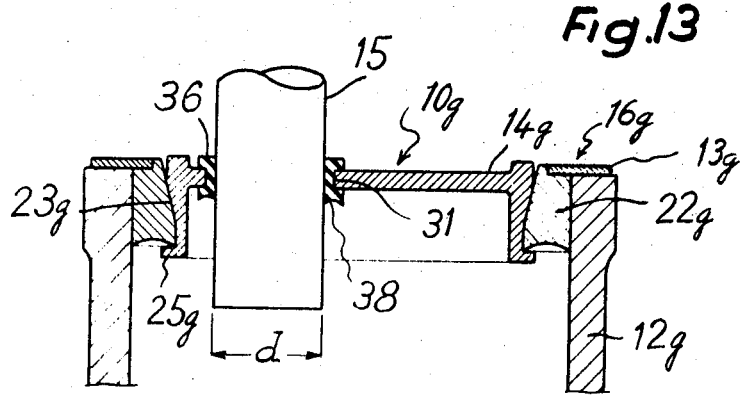
Figure 14:
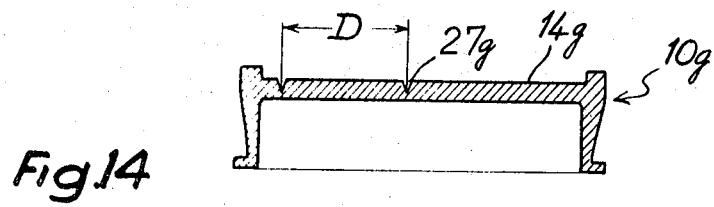
Figure 16:
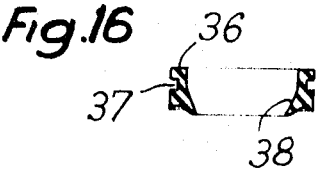
Figure 15:
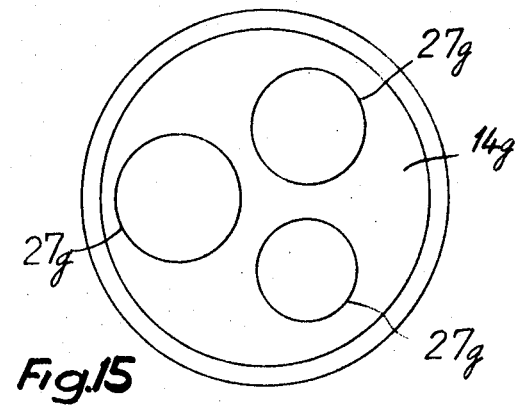
Figure 17:
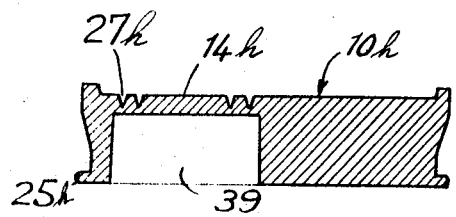
Figure 18:
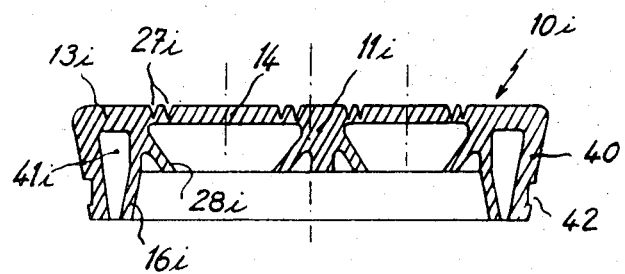
Figure 19:
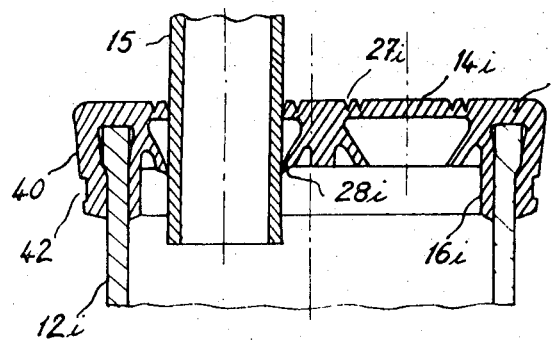
Figure 20:
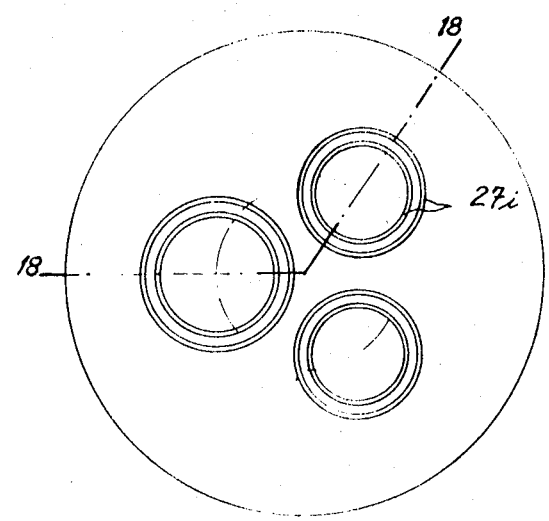
Figure 21:
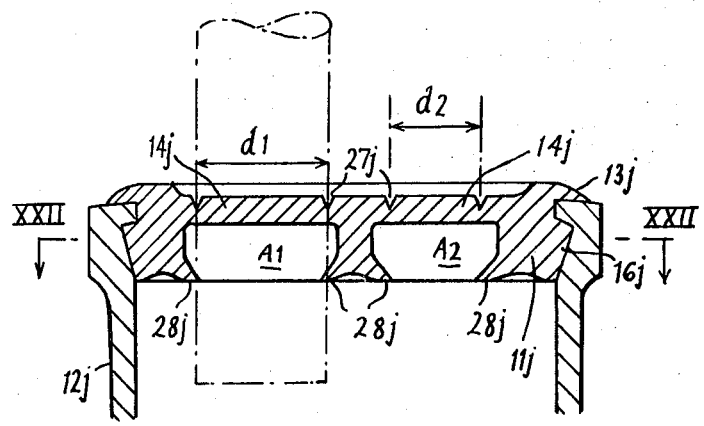
Figure 22:
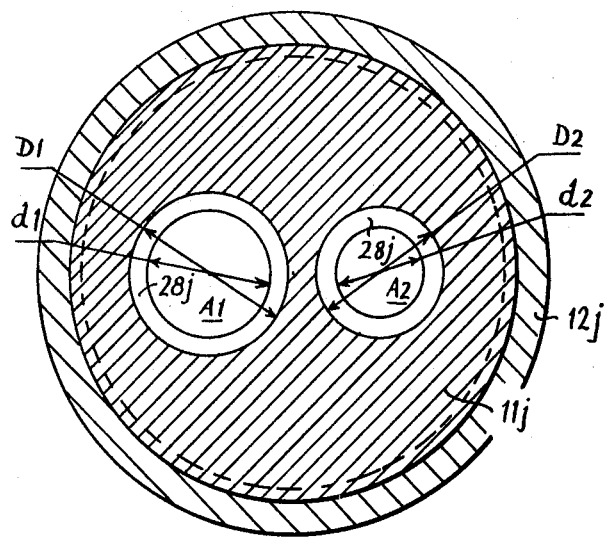

In order that the invention may more clearly understood, reference will now be made to the accompanying drawings which show certain embodiments thereof by way of example in conjunction with an illustration of prior art practice, and in which:

FIGS. 1 and 2 illustrate the practice of sealing pipe sections as used in the prior art, FIGS. 3 and 4 show in axial section two simple embodiments of the invention located on the open ends of pipe sections, respectively of different type, FIGS. 5 and 6 show similar views of two further embodiments, FIG. 7 shows a plan view of the plug of the closure members of FIGS. 5 and 6, FIGS. 8 and 9 show axial sections through two modifications of the plug, FIG. 10 is a plan view of the stopper of FIG. 9, FIGS. 11 and 12 show axial section and plan view respectively of a closure member derived from that of FIG. 6, FIG. 13 shows an axial section through a further embodiment, FIG. 14 shows an axial section through the basic plug of the member of FIG. 13, before removal of the pipe-admitting portion, FIG. 15 shows a plan view of the plug of FIG. 13, FIG. 16 shows an axial section through the sealing sleeve of FIG. 13, FIG. 17 shows a modification of the plug of FIG. 13, FIGS. 18 and 19 show sections through another embodiment, FIG. 20 shows a plan view of the member of FIG. 18, FIG. 21 shows an axial section through a further simple embodiment located on the open end of a pipe section and FIG. 22 shows a section on the line XXII of FIG. 21.

Referring now to the drawings, FIGS. 1 and 2 illustrate closure members of the prior art, where it is required to seal off the open end 2 of a branch pipe 3 projecting from a down pipe 1, with the proviso that it may subsequently be desired to pass through the open end 2, a pipe 4 of a diameter less than that of said open end 2. To seal off the end 2, a metal stopper 6 is used, as shown in FIG. 1. In order to connect the pipe 4, the metal stopper is removed and the space between the pipe 4 and the wall of the pipe end 2 is filled with plaster 5 (FIG. 2.). The method is fairly rudimentary, and produces a joint which is not very tight after the plaster has aged. In addition, the joint is rigid and transmits mechanical and sonic vibrations. In order to avoid these disadvantages, the invention proposes a closure member, various embodiments of which are shown in FIGS. 3 to 20, for obturating the open end of a pipe section 12 and to allow the connection of a pipe 15 of diameter less than that of said open end. Similar parts are indicated in different embodiments by the same numeral in association with a different letter. The closure member according to the invention is of the type comprising a plug 10 suitable for fitting to the open end of the pipe section 12, but in accordance with the invention, the plug is associated with means 13 for limiting axial movement into the opening of the pipe section and has a resilient lateral joint means 16 applied to the internal side wall of the open end of the pipe section in order to effect a seal and form an axial stop for the plug. The plug comprises a diaphragm 14 made of a material which may easily be cut in order to allow a pipe 15 to be passed therethrough of a diameter less than that of the open end. FIG. 3 shows a simple form of the closure member.

A closure member according to the invention may, therefore, be used either solely for ensuring the obturation of the open end of a pipe section, in which case the diaphragm 14 is not cut through, or both for obturating and connecting the pipe section to a pipe of less diameter after the diaphragm has been cut, in order to allow passage of the pipe therethrough. The diaphragm is preferably made of a relatively supple material such as rubber or supple plastics material and it effects sealing and promotes insulation against mechanical and sonic vibration.

In all embodiments, the member is instantaneously fittable to the pipe section and, if necessary, it may be replaced without difficulty.

The member may be produced in one moulded piece or may comprise a plurality of elements connected together. Thus, it may be produced in the form of two separate elements, namely a seal washer and a plug of complementary shape assembled one inside the other.

The member as shown in FIG. 3 consists essentially of a plug 10 comprising a cylindrical body 11 which passes into the pipe section 12, an external flange 13 limiting the axial movement of the plug, by abutting the end face of the pipe section, and a diaphragm 14. The whole is made from a relatively supple material such as for example a rubber having a Shore A hardness of the order of 80, or a plastics material having a similar degree of suppleness. In addition, the diaphragm 14 of the plug has an external face which is reduced in thickness by at least one notch or a groove 27 to form, for example, a circular shape. This enables a hole of suitable diameter to be easily cut in the diaphragm 14 so that the end of a pipe 15 to be connected to the pipe section may be passed therethrough. The diameter of this hole will preferably be slightly smaller than that of the pipe 15 so that the edge of this hole resiliently squeezes the pipe 15 and effects a good seal.

The plug 10 has in addition a lateral 16 constituted by a resilient washer fixed to the outside of the body 11 and applied to the inner side wall of the pipe. This joint 16 has, in the rest position, an external diameter which is slightly larger than the internal diameter of the pipe section, taking into account the manufacturing tolerances thereof, so as to effect the seal and also act as an axial stop for the plug, when it is inserted in the pipe section. The joint 16 is preferably more supple than the body of the plug. It may be made of a rubber having a Shore A hardness of the order of about 40 to 45. It may be attached to the plug or may be moulded therewith.

Whilst in the case of FIG. 3 the shape of the closure member is suitable for adaptation to a cement or stone pipe whose end is internally of cylindrical form, the shape of the member of FIG. 4 is suitable for adaptation to a pipe line 12a made of cast iron, the end of which has a flange 17a. In this case, the supple washer of the sealing joint 16a is adhered or moulded to the end of the body 11a of the plug and it has a profile matched to that of the adjacent groove at the flange 17a. The diaphragm 14a also has at least one circular notch or groove 27a having the diameter of a pipe which may be desired to be connected to the pipe section 12a.

In the case of FIGS. 5 and 6, the closure member is composed of two separate parts:

a. a lateral sealing joint 16b, 16c of the type such as those used for fitting pipes and comprising a supple washer 22b, 22c fixed to a flange 13b, 13c supported on the end of the pipe section 12b, 12c in order to limit the axial movement of the joint. The supple sealing washer 13b, 22c is applied to the internal lateral face of the pipe section. In the case of FIG. 5, the flange 12b is rigid, for example, made of metal, whilst in FIG. 6, the flange is made of rubber which is harder than the sealing washer 22c. The external shape of these joints 16b, 16c is matched to the shape of the end of the pipe sections to which they are to be adapted but in the two cases their internal shape is similar, having a tapered part 22b, 22c which is normally intended for facilitating the passage of the part of the pipe to be fitted in the end of the pipe section 12b, 12c.

This identity in the internal shape of these joints of known type is profitably used for producing the second part of the device which is indicated hereinafter.

b. an obturating plug 10b, 10c fitted in the joint 16b, 16c and has for this purpose, a tapered lateral face which is applied to the internal tapered lateral face 23b, 23c of the washer 22b, 22c. This tapered fitting ensures the seal of the assembly at the same time as it limits the axial movement of the plug in the washer. The axial stopping of the plug in the joint against the effect of the internal pressure is ensured by a flange 25b, 25c made on the internal end of the body of the plug and having an external diameter larger than the internal diameter of the supple washer of the joint. This flange 25b, 25c clears the washer by resiliently repelling it and abuts, after assembly, on the face of the internal end of the washer.

The plug 10b, 10c has, as in the preceding embodiment, a diaphragm 14b, 14c which may easily be cut in order to permit a pipe 15 of smaller diameter to be connected as explained previously. However, in the present case, the diaphragm has on the outside a plurality of notches 27c having the different diameters corresponding to those of the pipes which are most currently used (FIG. 7).

The advantage of these two latter embodiments resides in that only a single plug shape 10b, 10c need be provided for a predetermined pipe section diameter, whatever the shape and type of pipe section, the junction between the plug and the pipe section being ensured by a joint 16 of known type, this being easily available since it is already used moreover for conventionally fitting pipe sections. This enables both the manufacturer and the fitter to carry a smaller stock of plugs 10. FIG. 8 illustrates a modification of the plug 10 which is more especially suitable for the joint 16b of FIG. 5. It presents the particular feature of having concentric notches 27d and, at a certain distance below the diaphragm 14d, sealing lips 28d moulded thereto, having a diameter slightly smaller than the diameter of the notches 27d of the diaphragm and located in the same axis.

When a pipe 15 of small diameter is connected, after the diaphragm 14d has been cut through, the pipe which passes through the hole in the diaphragm resiliently repels the lips 28d. The pipe 15 is therefore doubly held by the diaphragm 14d and the lips 28d.

FIGS. 9 and 10 illustrate another modification similar to the preceding embodiment but in which the plug 10e has an external flange 13e intended to cover the flange 13c of the sealing joint 16c according to FIG. 6. Provided that this flange 13e limits the axial movement of the plug in the joint, the tapered part 23e on the plug may be replaced by a cylindrical part. So as to be made from a supple material such as rubber, the plug 10d, 10e according to FIGS. 8 or 9 may be combined in a single member with its joint 16d, 16e so as to exhibit an outer lateral surface similar to that of FIG. 4. The modified plug can be inserted directly in the pipe like that of FIG. 4.

FIGS. 11 and 12 show a closure member derived from that of FIG. 6 and constituted by a plug 10f and a sealing joint 16f which are separate but assembled one inside the other. In this case, the plug 10f is made of a rigid material, for example, cast iron, hard plastics material, ebonite or the like, and after manufacture, has a plurality of holes therein which have a diameter slightly larger than the diameter of a pipe 15 which is to be connected to the pipe section 12f. Each of these holes is normally closed by a sleeve 32 made of rubber or similar supple material, the central part of which forms a diaphragm 33 which may easily be cut through in order to allow passage therethrough of the pipe 15. This cutting may be facilitated by the presence of the circular notches 34 on the upper face of the sleeve. On the inside, the sleeve has a supple sealing lip 35 and is retained on the plug 10f by engaging the flange 31 of the hole of the plug in the annular groove of the sleeve. FIG. 11 shows that the sleeve 32 may form, once cut, a sealing joint around the pipe 15 of smaller diameter passing through the plug 10f.

In the case of FIGS. 13, 14, 15 and 16, the plug 10g has, as in FIGS. 3 to 6, a relatively thin continuous plug 14g (FIG. 14) having notches 27g (FIG. 15). This plug 14g may be made of a relatively hard material although it can be cut by the fitter and its notches 27g have a diameter D slightly larger than the diameter d of the corresponding pipe 15 to be connected. After a hole has been cut in the plug, a resilient sealing joint 36 with groove 37 and with lip 38 is mounted on the edge of this hole so as to fill the gap between the plug 10g and the pipe 15 to be connected.

FIG. 17 shows a modification of the preceding plug. In this case, the plug 10h is relatively thick but it has, opposite the notches 27h, blind holes 39 opening on the internal face of the plug and leaving only fairly thin diaphragms 14h inside the notches. When one of these diaphragms is cut, a joint 36 is matched to the edge of the hole and the pipe to be connected is engaged. The side surface of the hole 39 then forms a support on which the sealing lip 38h of the joint rests, as may be seen in FIG. 11, where this latter characteristic is also found. Finally, FIG. 17 shows that the flange 25h of the plug 10h is rounded in order to facilitate the engagement or removal of the plug from the sealing joint 16g.

Of course, the invention is not limited to the above described embodiments, of which other modifications are conceivable. In particular, the washer 16 may have shapes other than those shown, for example, it may have a flange fitting in a circular internal groove of the pipe section in order to limit the axial movement in the pipe section. When these washers have an internal surface of shape different from the tapered surface 23, the plug has a corresponding external lateral surface in order to be fitted to this washer.

FIGS. 18, 19 and 20 show yet another embodiment of closure member according to the invention. The member of this embodiment is constituted by a plug 10i which, as in the case of FIG. 4, comprises a cylindrical body 11i of supple material, such as rubber, having a part 16i that constitutes a side joint in the form of a circular lip insertable directly into the pipe section so as to make sealing contact with the lateral inner wall of the said pipe section. The diaphragm 14i, as in the case of FIGS. 8 and 9, has a plurality of concentric cut-away portions 27i and at a predetermined distance below the diaphrgm sealing lips 28i moulded so as to have a diameter that is a little less than the smallest diameter of the corresponding cut-away portions and located on the same axis. These sealing lips are intended to be elastically applied to the small diameter pipe 15.

In this embodiment, the plug 10i has a circular collar 13i exteriorly extended towards the base by an elastic skirt 40 of a length substantially equal to that of the joint 16i. The skirt 40 and the joint 16i have opposed surfaces which are tapered in such a manner that they leave between them an annular space 41 which narrows towards the extremities of the skirt and joint. This annular space has at its end a size which is a little greater than the thickness of the wall of the pipe section 12i and at its exit as a size which is a little less than this thickness.

When the plug is put in place in the pipe section 12i (FIG. 19), the wall adjacent the extremity of the pipe section will be elastically gripped between the internal lateral joint 16i of the exterior skirt 40 whilst the end of the pipe section will abut the end of the annular space 41 on the circular collar 13i to limit the penetration of the plug. The plug 10i thus ensures an hermetic sealing of the pipe section. If it is desired to effect sealing for greater pressures, the fixing of the plug may be completed by a locking collar located around the skirt 40. An external neck 42 may be provided for this purpose in the skirt 40 for locating the locking collar. The larger size provided at the base of the annular space 41 allows the plug to be adapted to pipe sections of differing sizes within the limit of the usual manufacturing tolerances and also be adapted on pipe sections that have extremities whose exterior shape is a little different. For use with a pipe 15 of small diameter on the pipe section 12i, the diaphragm 14i is cut through along the grooves 27i corresponding to the diameter of the pipes. FIG. 19 shows such an arrangement.

Referring to FIG. 21 there is shown a closure member comprising a circular body 11j made of a unitary molded member of a resilient material. The plug has two circular chambers $A_1$ and $A_2$ having different diameter and a sidewall 16j adapted to fit the internal sidewall of a pipe 12j. A flange 13j extends from the body and abuts the end of the pipe 12j thereby limiting the axial movement of the body 11j in the pipe. Each of the chambers $A_1$, $A_2$ is closed at its upper end by a diaphragm 14j. A circular groove 27j in the outer surface of each of the diaphragms 14j reduces the thickness of the diaphragms on a circle defining a circular portion of its respective diaphragm. The diameter of each of the circular portions is less than that of its corresponding chamber. The depth of each of the circular grooves 27j is such that each of the circular portions may easily be removed to leave a sealing lip for sealing a pipe of smaller diameter than that of the pipe 12j, as indicated by the dash-dot lines. A second sealing lip 28j, axially spaced from its respective diaphragm, extends radially in each chamber and is coaxial with the circular portion of its respective diaphragm 14j thereby to provide a second sealing lip for the pipe of smaller diameter. The lips 28j are at the lower extremities of their respective chambers.

Referring to FIG. 22 it is possible to see clearly that the body 11j is largely solid and that the diameters $d_1$ and $d_2$ of the pipes of smaller section sealing with the lips 28j and passing through the chambers $A_1$ and $A_2$ are less than the diameters $D_1$ and $D_2$ of the respective chambers.

I claim:

1. A closure member for obturating the end of a first pipe in such a way that a pipe of smaller diameter may be connected thereto, the closure member being a unitary molded member of a resilient material and comprising a circular body, a sidewall on the body adapted to provide a seal with the internal sidewall of the first pipe, flange means projecting radially from the body to limit the passage of the closure member into the first pipe, a diaphragm closing one end of the body, a plurality of concentric circular portions in the diaphragm, corresponding to a pipe of smaller diameter and each being defined by a circular groove providing an annulus of reduced thickness in the outer face of the diaphragm and of a depth such that one of said circular portions may be removed to provide a first sealing lip for a pipe of smaller diameter, and second sealing lip means axially extending within said body and coaxial with said concentric circular portions of the diaphragm to provide a second sealing lip for the respective pipe of smaller diameter.

2. A closure member as claimed in claim 1 wherein the diameter of the second sealing lip means is no greater than the diameter of the smallest of said concentric circular grooves.

* * * * *